US010388284B2

(12) United States Patent
Choi et al.

(10) Patent No.: US 10,388,284 B2
(45) Date of Patent: Aug. 20, 2019

(54) SPEECH RECOGNITION APPARATUS AND METHOD

(71) Applicant: Samsung Electronics Co., Ltd., Suwon-si (KR)

(72) Inventors: Hee Youl Choi, Hwaseong-si (KR); Seokjin Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 15/862,935

(22) Filed: Jan. 5, 2018

(65) Prior Publication Data

US 2018/0144749 A1 May 24, 2018

Related U.S. Application Data

(63) Continuation of application No. 15/205,515, filed on Jul. 8, 2016, now Pat. No. 9,881,615.

(30) Foreign Application Priority Data

Aug. 20, 2015 (KR) ........................ 10-2015-0117422

(51) Int. Cl.
*G10L 15/06* (2013.01)
*G10L 15/08* (2006.01)
(Continued)

(52) U.S. Cl.
CPC .............. *G10L 15/32* (2013.01); *G10L 15/08* (2013.01); *G10L 15/16* (2013.01); *G10L 15/183* (2013.01);
(Continued)

(58) Field of Classification Search
CPC ....... G10L 15/32; G10L 15/16; G10L 15/183; G10L 15/22; G10L 15/08
See application file for complete search history.

(56) References Cited

U.S. PATENT DOCUMENTS

| | | | |
|---|---|---|---|
| 5,606,644 | A | 2/1997 | Chou et al. |
| 8,457,959 | B2 | 6/2013 | Kaiser |

(Continued)

FOREIGN PATENT DOCUMENTS

| | | | |
|---|---|---|---|
| JP | 4115723 | B2 | 7/2008 |
| JP | 4962962 | B2 | 6/2012 |
| KR | 10-1483947 | B1 | 1/2015 |

OTHER PUBLICATIONS

Lehr, Maider, et al., "Discriminatively estimated joint acoustic, duration, and language model for speech recognition." *Acoustics Speech and Signal Processing (ICASSP), 2010 IEEE International Conference on. IEEE*, 2010. (pp. 5542-5545).

(Continued)

*Primary Examiner* — Brian L Albertalli
(74) *Attorney, Agent, or Firm* — NSIP Law

(57) ABSTRACT

A speech recognition apparatus and method. The speech recognition apparatus includes one or more processors configured to reflect a final recognition result for a previous audio signal in a language model, generate a first recognition result of an audio signal, in a first linguistic recognition unit, by using an acoustic model, generate a second recognition result of the audio signal, in a second linguistic recognition unit, by using the language model reflecting the final recognition result for the previous audio signal, and generate a final recognition result for the audio signal in the second linguistic recognition unit based on the first recognition result and the second recognition result. The first linguistic recognition unit may be a same or different linguistic unit type as the second linguistic recognition unit.

36 Claims, 6 Drawing Sheets

(51) Int. Cl.

| | |
|---|---|
| ***G10L 15/16*** | (2006.01) |
| ***G10L 15/22*** | (2006.01) |
| ***G10L 15/32*** | (2013.01) |
| ***G10L 15/183*** | (2013.01) |

(52) U.S. Cl.

CPC ...... *G10L 15/22* (2013.01); *G10L 2015/0635* (2013.01); *G10L 2015/221* (2013.01); *G10L 2015/223* (2013.01)

(56) References Cited

U.S. PATENT DOCUMENTS

| | | | |
|---|---|---|---|
| 8,620,655 | B2 | 12/2013 | Xu et al. |
| 8,965,763 | B1 | 2/2015 | Chelba et al. |
| 9,153,231 | B1 | 10/2015 | Salvador et al. |
| 9,263,036 | B1 | 2/2016 | Graves |
| 2012/0205765 | A1 | 8/2012 | Hynecek |
| 2015/0019214 | A1 | 1/2015 | Wang et al. |
| 2015/0095026 | A1 | 4/2015 | Bisani et al. |
| 2015/0127327 | A1 | 5/2015 | Bacchiani et al. |
| 2015/0170640 | A1 | 6/2015 | Sak et al. |
| 2015/0199963 | A1 | 7/2015 | Maaninen |
| 2016/0140956 | A1 | 5/2016 | Yu et al. |
| 2016/0171974 | A1 | 6/2016 | Hannun et al. |
| 2016/0260428 | A1 | 9/2016 | Matsuda et al. |

OTHER PUBLICATIONS

Graves, Alex. "Sequence transduction with recurrent neural networks." arXiv preprint arXiv:1211.3711 (2012).

Graves, Alex., "Speech recognition with deep recurrent neural networks." *Acoustics, speech and signal processing* (*icassp*), *2013 ieee international conference on. IEEE*, 2013. (pp. 6645-6649).

Chorowski, Jan, et al. "End-to-end continuous speech recognition using attention-based recurrent NN: first results." arXiv preprint arXiv:1412.1602 (2014).

Hannun, Awni, et al. "Deep speech: Scaling up end-to-end speech recognition." *arXiv preprint arXiv:1412.5567* (2014).

Chorowski, Jan K., et al. "Attention-based models for speech recognition." *Advances in Neural Information Processing Systems*. 2015, (pp. 577-585).

Github repository, "attention-lvcsr", committed on Jul. 13, 2015, available at https://github.com/rizar/attention-lvcsr/tree/f1b6d4f59dc99731702852287d2cde04ffababa4.

Extended European Search Report dated Dec. 2, 2016 in counterpart European Patent Application No. 16183908.9 (8 pages, in English).

SPEECH RECOGNITION APPARATUS AND METHOD

CROSS-REFERENCE TO RELATED APPLICATION(S)

This application is a continuation of U.S. patent application Ser. No. 15/205,515, filed on Jul. 8, 2016, which claims priority benefit under 35 USC 119(a) of Korean Patent Application No. 10-2015-0117422, filed on Aug. 20, 2015 in the Korean Intellectual Property Office, the entire disclosures of which are incorporated herein by reference for all purposes.

BACKGROUND

1. Field

The following description relates to speech recognition technologies.

2. Description of Related Art

A speech recognition engine of an electronic device or server is generally composed of an acoustic model, a language model, and a decoder. The acoustic model may be a static model that outputs probabilities of phonemes and pronunciations of an input audio signal based on such pronunciations and connectivity of the same. The language model is a static model that may independently output information associated with phonemes, pronunciations, words, sentences, and the like, based on an independently trained or directed connectivity of the same. The decoder decodes the output of the acoustic model and the language model to return a final recognition result of the input audio signal based on the outputs of the acoustic model and the language model. A Gaussian Mixture Model (GMM) has generally been used in the past for the acoustic model, but recently, speech recognition performance has been improved by using a Deep Neural Network (DNN) acoustic model. As noted, such speech recognition techniques use acoustic and language models that have been trained independently of each other. Still further, a Viterbi decoding scheme has typically been used in the acoustic model.

SUMMARY

One or more embodiments provide a speech recognition apparatus, including a first recognizer configured to generate a first recognition result of an audio signal, in a first linguistic recognition unit, by using an acoustic model, a second recognizer configured to generate a second recognition result of the audio signal, in a second linguistic recognition unit, by using a language model, and a combiner configured to combine the first recognition result and the second recognition result to generate a final recognition result of the audio signal in the second linguistic recognition unit and to reflect the final recognition result in the language model.

The second recognizer may be configured to generate a second recognition result of a subsequent audio signal in the second linguistic unit by using the language model reflecting the final recognition result, wherein the combiner may be further configured to combine a first recognition result of the subsequent audio signal, generated by the acoustic model, and the second recognition result of the subsequent audio signal as a final recognition result of the subsequent audio signal.

The acoustic model may be an attention mechanism based model and the first recognition result may represent probabilities, for linguistic recognition units for the audio signal, that are not based on connectionist temporal classification (CTC) for the linguistic recognition units, wherein the second recognition result may represent probabilities based on temporal connectivity between recognized linguistic recognition units for the audio signal.

The first linguistic recognition unit may be a same linguistic unit type as the second linguistic recognition unit.

The first recognizer may be configured to generate a recognition result of the audio signal in the first linguistic recognition unit by using a first acoustic model and to generate the first recognition result of the audio signal in the second linguistic recognition unit by using a second acoustic model that is provided the recognition result of the audio signal in the first linguistic recognition unit.

The first recognition result and the second recognition result may include information on respective probabilities of, or states for, the first and second linguistic recognition units.

The combiner may input the first recognition result and the second recognition result into a unified model, with a result of the unified model being the final recognition result.

The first recognizer, the second recognizer, and the unified model may be represented in a same neural network that is configured so as to connect a node of the neural network that represents an output of the acoustic model and a node of the neural network that represents an output of the language model to respective nodes of the neural network that represent inputs of the unified model.

The neural network may be configured to connect a node of the neural network that represents an output of the unified model that provides the final recognition result to a node of the neural network that represents an input of the language model.

A number of nodes of the neural network that represent outputs of the unified model may be dependent on a number of nodes of the neural network that represent inputs to the language model.

The neural network may be configured according to having been trained, for at least the acoustic model and the language model, in a learning process based on a learning algorithm that includes a back propagation learning algorithm.

The neural network may be configured according to having been trained in a learning process using training data, where the learning process includes simultaneously training the acoustic model, the language model, and the unified model.

The first recognizer may perform a neural network-based decoding based on an Attention Mechanism to determine the first recognition result in the first linguistic recognition unit.

One or more embodiments provide a speech recognition method that includes generating a first recognition result of an audio signal, in a first linguistic recognition unit, by using an acoustic model, generating a second recognition result of the audio signal, in a second linguistic recognition unit, by using a language model, combining the first recognition result and the second recognition result to generate a final recognition result of the audio signal in the second linguistic recognition unit, and reflecting the final recognition result in the language model.

The first linguistic recognition unit may be a same linguistic unit type as the second linguistic recognition unit.

The generating of the first recognition result may include generating a recognition result of the audio signal in the first linguistic recognition unit by using a first acoustic model and generating the first recognition result of the audio signal in the second linguistic recognition unit by using a second acoustic model that is provided the recognition result of the audio signal in the first linguistic recognition unit.

The first recognition result and the second recognition result may include information on respective probabilities of, or states for, the first and second linguistic recognition units.

The generating of the final recognition result may include inputting the first recognition result and the second recognition result into a unified model, with a result of the unified model being the final recognition result.

The acoustic model, the language model, and the unified model may be represented in a same neural network that is configured so as to connect a node of the neural network that represents an output of the acoustic model and a node of the neural network that represent an output of the language model to respective nodes of the neural network that represent inputs of the unified model.

The neural network may be configured to connect a node of the neural network that represents an output of the unified model that provides the final recognition result to a node of the neural network that represents an input of the language model.

A number of nodes of the neural network that represent outputs of the unified model may be dependent on a number of nodes of the neural network work that represent inputs to the language model.

The neural network may be configured according to having been trained, for at least the acoustic model and the language model, in a learning process based on a learning algorithm that includes a back propagation learning algorithm.

The neural network may be configured according to having been trained in a learning process using training data, where the learning process included simultaneously training the acoustic model, the language model, and the unified model.

The method may further include simultaneously training the acoustic model, the language model, and the unified model in a learning process using training data, before the generating of the first recognition result and the generating of the second recognition result.

The generating of the first recognition result may include performing a neural network-based decoding based on an Attention Mechanism to determine the first recognition result.

One or more embodiments provide a speech recognition apparatus, including a first recognizer configured to generate a recognition result of an audio signal in a first linguistic recognition unit by using a first acoustic model, and to generate a first recognition result in a second linguistic recognition unit by using a second acoustic model provided the recognition result of the audio signal in the first linguistic recognition unit, a second recognizer configured to generate a second recognition result in the second linguistic recognition unit by using a language model, and a combiner configured to combine the first recognition result and the second recognition result to generate a final recognition result of the audio signal.

The combiner may input the first recognition result and the second recognition result into a unified model, with a result of the unified model being the final recognition result.

The first recognizer, the second recognizer, and the unified model may be represented in a same neural network that is configured so as to connect a node of the neural network that represents an output of the second acoustic model and a node of the neural network that represents an output of the language model to respective nodes of the neural network that represent inputs to the unified model.

One or more embodiments provide a speech recognition system, including a first recognizer configured to generate a first recognition result of an audio signal using a first linguistic recognition unit and an acoustic model, a second recognizer configured to generate a second recognition result of the audio signal in a second linguistic recognition unit by using a language model, and a combiner configured to combine the first recognition result and the second recognition result using a neural network configured to implement a unified model that generates a final recognition result of the audio signal in the second linguistic recognition unit and that provides the final recognition result for reflection in the language model.

The acoustic model and the language model may be models previously trained using independent training processes, and the unified model may be a model trained using a training process that uses training data with the pre-trained acoustic and language models and that reflects the final recognition result in the language model to further train the language model.

One or more embodiments provide a speech recognition apparatus, including a speech receiver configured to capture audio of a user and to generate an audio signal based on the captured audio, a speech recognizer comprising a first of one or more processors configured to provide results of an acoustic model that considers pronunciation for the audio signal and a language model that considers connectivity of linguistic units of the audio signal into a unified model, and to output a result of the unified model as a final recognition result of the audio signal, and a second of the one or more processors configured to perform predetermined operations and to perform a particular operation of the predetermined operations based on the output final recognition result.

The speech recognizer may be further configured to reflect the final recognition result in the language model to train the language model.

The first processor and the second processor may be a same processor of the one or more processors.

In the speech recognizer, the acoustic model, the language model, and the unified model may be represented in a same neural network that is configured according to having been trained, for at least the acoustic model and the language model, in a learning process by using a learning algorithm including a back propagation learning algorithm.

The first processor may be configured to perform at least one of controlling an outputting of the final recognition result audibly through a speaker of the apparatus or in a text format through a display of the apparatus, translating the final recognition result into another language, and processing commands for controlling the performing of the particular operation through the second processor.

Additional and/or alternative aspects will be set forth in part in the description which follows and, in part, will be apparent from the description, or may be learned by practice of the presented embodiments.

Figure 1:
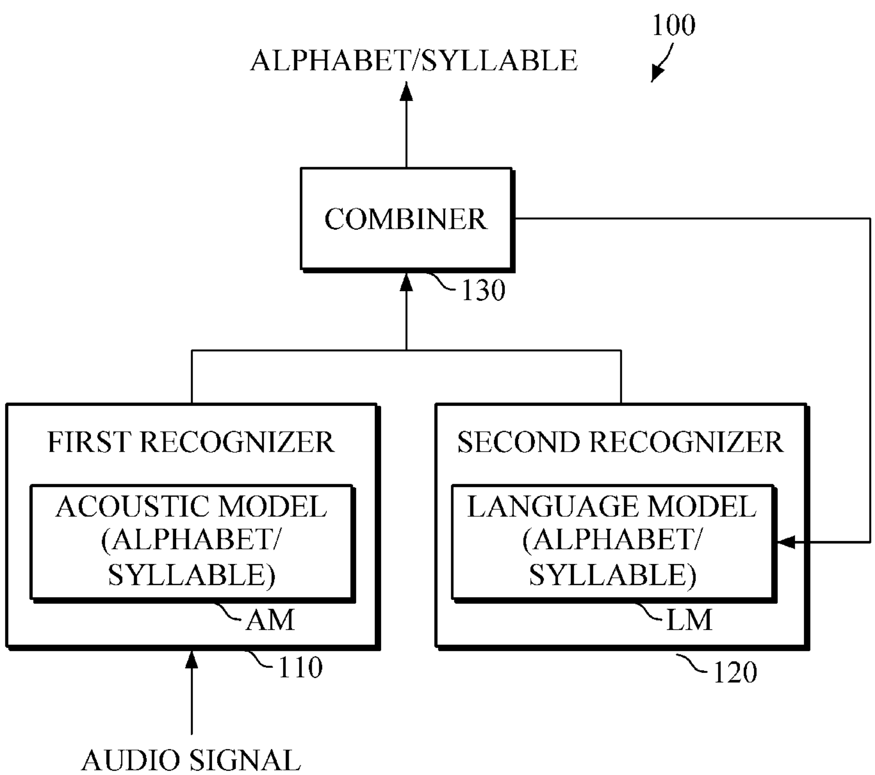
FIG. 1 is a block diagram illustrating a speech recognition apparatus according to one or more embodiments.

Throughout the drawings and the detailed description, unless otherwise described, the same drawing reference numerals will be understood to refer to the same or like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein may then be apparent to one of ordinary skill in the art. The sequences of operations described herein are merely examples, and are not limited to those set forth herein, but may be changed as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Unless otherwise defined, all terms including technical and scientific terms used herein have the same meaning as commonly understood by one of ordinary skill in the art to which respective embodiments belong. It will be further understood that terms, such as those defined in commonly-used dictionaries, should be interpreted as having a meaning that is consistent with their meaning in the context of the relevant art and the present disclosure and will not be interpreted in an idealized or overly formal sense unless expressly so defined herein.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Thus, the features described herein may be embodied in different forms, and are not to be construed as being limited to the examples described herein. Rather, the examples described herein have been provided so that this disclosure will be thorough, and will convey a scope of the disclosure to one of ordinary skill in the art.

FIG. 1 is a block diagram illustrating a speech recognition apparatus according to one or more embodiments.

Referring to FIG. 1, the speech recognition apparatus 100 includes a first recognizer 110, a second recognizer 120, and a combiner 130, for example.

The first recognizer 110 may output a first recognition result of an input audio signal in a linguistic recognition unit by using an acoustic model (AM). In this case, as only an example and noting that alternatives are available in differing embodiments, the audio signal may be converted into audio frames (e.g., 100 frames per second) through one or more preprocessing processes of extracting features from the audio signal, that may be input to the speech recognition apparatus 100. Here, references to an audio signal that may be input to an acoustic model, for example, should be considered a reference to any of the input audio signal, the audio signal converted into a digital form, the audio signal converted into audio frames, the audio signal that has been otherwise preprocessed, and the individual audio frames (or smaller portions of the same) or such individual audio frames resulting from such other preprocessing. Likewise, and as only an example, a reference to a previous audio signal, a current audio signal, or a subsequent audio signal should also be considered as referring to one or more previous audio frames, current audio frames, or subsequent audio frames, respectively, such as for demonstrating a temporal sequencing of recognition operations and future recognition operations' reliance on current and/or previous recognition results, or merely current recognition operations' reliance on previous recognition results.

In addition, herein, the linguistic recognition unit refers to a predetermined linguistic unit to be recognized among basic units in a language, such as phonemes, syllables, morphemes, words, phrases, sentences, paragraphs, and the like. Here, the phonemes, syllables, morphemes, words, phrases, sentences, and paragraphs, as only examples, may be considered respectively different types of linguistic units. In addition, linguistic units may vary depending on languages, such that the linguistic recognition unit may be predetermined based on respective known features of each language. In addition, herein, one linguistic unit type that is referred to as being greater than another linguistic unit type corresponds to the different linguistic unit types having a predetermined hierarchy. As only an example of such a predetermined hierarchy, in one or more embodiments the syllable linguistic unit type is greater than the phoneme linguistic unit type, the morpheme linguistic unit type is greater than the syllable linguistic unit type, the word linguistic unit type is greater than the morpheme linguistic unit type, the phrase linguistic unit type is greater than the word linguistic unit type, the sentence linguistic unit type is greater than the phrase linguistic unit type, and the paragraph linguistic unit type is greater than the sentence linguistic unit type, again noting that this is only one example of such a predetermined hierarchy of the example linguistic unit types.

In one or more embodiments, the linguistic recognition unit may be an alphabetic and/or syllabic unit. Hereinafter, the alphabetic or syllabic unit is used merely for convenience of explanation, and the linguistic recognition unit is not limited thereto.

The first recognizer 110 may input an audio frame, e.g., as converted by the preprocessing, into the acoustic model, and may output a first recognition result of the audio frame in/for a particular linguistic recognition unit. In this case, the first recognition result may include a linguistic recognition unit, such as alphabetic or syllabic probabilities or state information, for the audio frame. For example, the first recognition result may include identifying information and corresponding probabilities for one or more linguistic recognition units for each of one or more different linguistic recognition unit types.

In one or more embodiments, the acoustic model may generally output probabilities of phonemes, as the linguistic recognition unit, of each input audio frame. According to one or more embodiments, the acoustic model, which may be based on or represented by a neural network, may output probabilities or state information in an alphabetic or syllabic unit by using a neural network-based decoding method. The neural network, and other neural networks discussed herein, may include, but are not limited to, a Deep Neural Network (DNN), a Recurrent Neural Network (RNN), a Bidirectional Recurrent Deep Neural Network (BRDNN), and the like.

In one or more embodiments, the neural network-based decoding method may include an Attention Mechanism. By the neural network representing one or more acoustic models decoding of the input audio data based on the Attention Mechanism, recognition results of audio frames may be output in an alphabetic or syllabic unit, including probabilities of such alphabetic or syllabic units. The Attention Mechanism refers to a viewing of data sequentially by selecting some portions of the data, rather than viewing all of the data at once. For example, in a given image, the Attention Mechanism refers to viewing one portion of the image after another, rather than recognizing the whole image at once. By using the neural network decoding method based on the Attention Mechanism, loss of information, which occurs due to segmentation, may be minimized.

The second recognizer 120 may output a second recognition result in a linguistic recognition unit by using a language model (LM), in which the second recognition result may include a linguistic recognition unit, e.g., alphabetic or syllabic probability information or state information. For example, the second recognition result may include identifying information and corresponding probabilities for one or more linguistic recognition units for each of one or more different linguistic recognition unit types.

The language model may model previous sequence(s) of phonemes, alphabet letters, syllables, words, and the like, e.g., based on final recognition results of corresponding recognition operations for previous audio data, and generates or outputs information for current phonemes, alphabet, syllables, words, and the like for the current audio data. According to one or more embodiments, the language model may be based on a neural network, and thus, may output probabilities or state information in an alphabetic or syllabic unit, such as in the acoustic model. The language model may be provided linguistic unit information for one or more previous final linguistic unit recognitions of the example combiner 130 so the language model can model such sequences of one or more linguistic unit types to provide a probability for a current linguistic unit, such as for the current alphabetic or syllabic unit. In or more embodiments the speech recognition apparatus includes a memory to buffer previous final recognition results of the combiner 130. As only an example, the combiner 130 or the second recognizer 120 may represent one or more processing devices and a memory to buffer such previous final recognition results of the combiner 130. For example, if the combiner 130 stores such information, the combiner 130 may provide such previous result information to the second recognizer 120 at a same time as the first recognizer 110 is known to be operating on a new or next input audio signal, or the second recognizer 120 could operate independently and automatically generate such linguistic unit probabilities immediately or sometime after the combiner 130 derives such final recognition results, independent of the operation of the first recognizer 110.

The combiner 130 may combine the first recognition result and the second recognition result, and may output a final recognition result for the audio signal in a particular linguistic recognition unit. For example, the combiner 130 may input the first recognition result and the second recognition result into a predetermined unified model, and may provide a result or output of the predetermined unified model as the final recognition result in the example alphabetic or syllabic unit.

Similar to the acoustic model and the language model, the unified model may be based on a neural network. In addition, in one or more embodiments, the acoustic model, the language model, and the unified model may be integrated and represented by one network, e.g., a single neural network. For example, in one or more embodiments, nodes of the neural network representing outputs of an acoustic model and nodes of the neural network representing outputs of a language model are connected to nodes of the neural network representing inputs of the unified model, thereby forming a single neural network. As only an example, the number of nodes of the neural network representing the inputs of the unified model may be equal to the number of nodes of the neural network representing the respective outputs of the acoustic model and the language model.

Once a final recognition result of an audio signal is output in an alphabetic or syllabic unit, for example, once probabilities of alphabet letters or syllables of an audio frame or state information thereon is determined, the combiner 130 may reflect the output result in the language model. Thus, for example, the language model is a dynamic or learning model that reflects recognition results from previous unified model results for one or more frames of one or more acoustic models and one or more language models, which enhances recognition results for current audio frames. To this end, in one or more embodiments, the aforementioned single neural network may be configured in such a manner that the number of the nodes of the neural network representing the outputs of the unified model is equal to, or dependent on, the number of the nodes of the neural network representing the inputs of the language model, or in such a manner that the number of the nodes of the neural network representing inputs of the language model is dependent on the number of nodes of the neural network representing the outputs of the unified model.

As described above, based on a previous recognition operation, the combiner 130 reflects or has reflected an output final recognition result of the previous audio frame in the language model, thereby enabling the second recognizer 120 to calculate and output the current alphabetic or syllabic probabilities or state information of the current audio frame by considering the final recognition result of the previous audio frame. Accordingly, in one or more embodiments, while the first recognizer 110 inputs a current frame of the audio signal into the acoustic model to generate first recognition results, the second recognizer 120 may input a previous frame's final recognition results by the combiner 130 into the language model to generate the second recognition results.

In addition, in one or more embodiments, the acoustic model, the language model, and the unified model are trained in advance to output probabilities or state information in a predetermined linguistic recognition unit, for example. In this case, the acoustic model, the language model, and the unified model may be trained collectively in a learning or training process by using a learning algorithm, such as a back propagation learning algorithm, and using an objective function. For example, one or more embodiments include simultaneously training the acoustic model and the language model, e.g., based on the same training data, and may further include the unified model reflecting the final recognition result in the language model for subsequent consideration by the language model. In this way, all of the acoustic model, the language model, and the unified model may be trained through a single training operation. However, the training is not limited thereto. For example, one or more embodiments include training the acoustic model and the language model in advance separately from each other, e.g., independently, based on the same or different training data and may further include combining the unified model therewith to be trained based on the training results of the acoustic model and the language model. Alternatively, one or more embodiments include partially independently and partially dependently training the acoustic model and the language model.

In one or more embodiments, as compared to embodiments where the acoustic model and the language model are trained separately from each other and then are combined, when the acoustic model and the language model are trained collectively, e.g., such that modeling roles do not overlap, each model may perform its functions more efficiently, thereby potentially enabling more accurate speech recognition. For example, while previous acoustic model techniques may have explicitly considered connectivity between linguistic units such as through implemented connectionist temporal classification (CTC), in one or more embodiments the acoustic model does not implement CTC. In an example, the acoustic model may consider only pronunciations of potential linguistic units in input audio data. Here, there may be some implicit connectivity information that is considered by the acoustic model, such as implicit connectivity information that may depend on the type of linguistic unit the acoustic model is set to recognize. Rather, in one or more embodiments, only the language model may explicitly rely on such connectivity information or connections between linguistic units.

Figure 2:
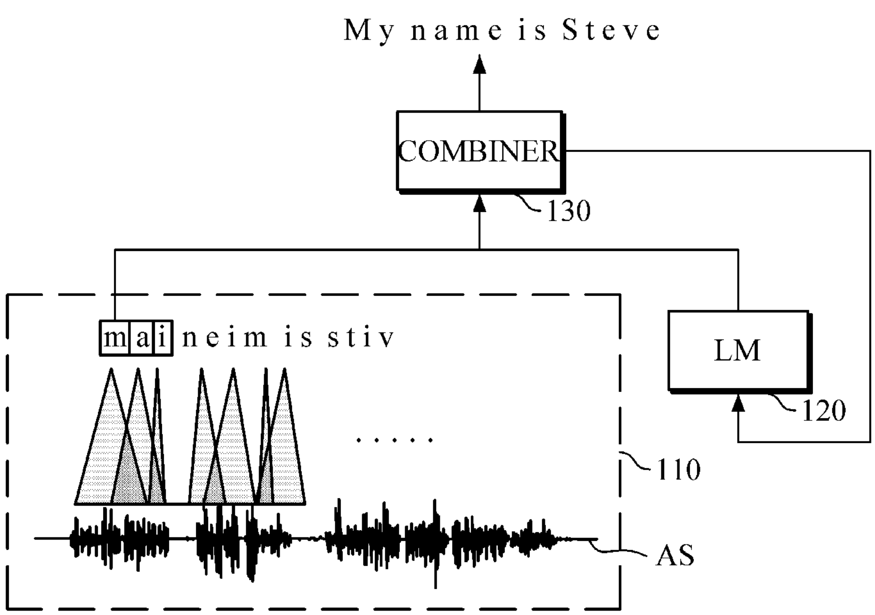
FIG. 2 is a diagram illustrating speech recognition performed by a speech recognition apparatus according to one or more embodiments.

FIG. 2 is a diagram illustrating speech recognition performed by a speech recognition apparatus, such as the speech recognition apparatus of FIG. 1, according to one or more embodiments. Here, the example received or captured voice or audio is represented by the audio signal (AS) that corresponds to a voiced "My name is Steve", such as by a user or from a previous recording or the same. Below, though FIG. 2 will be discussed with reference to the speech recognition apparatus of FIG. 1, FIG. 2 should be understood as not being limited to the same.

Referring to FIG. 2, the first recognizer 110 inputs the actual audio signal (AS) into an acoustic model in units of frames, and for each linguistic unit considered in the audio signal the first recognizer 110 outputs probabilities for one or more 26 alphabet letters as a result of the acoustic model, for example, for each audio frame. For example, the audio frames may have been derived by segmenting, such as through a speech receiver or other preprocessor, each of the linguistic units in the audio signal into separate audio frames. Alternatively, several audio frames may be used for a single linguistic unit in the audio signal, or two or more linguistic units in the audio signal may be included in a same audio frame. Thus, as only an example, with each linguistic unit in the audio signal being segmented into separate audio frames, each output result of the first recognizer 110 is input to the combiner 130. In this case, the acoustic model may indicate the highest probable alphabet letter for each audio frame, selecting from among the example 26 alphabet letters, which, in order, may be m, a, i, n, e, i, m, i, s, s, t, i, and v, for example. Along with at least one of the highest probable results from the acoustic model for each audio frame, the first recognizer 110 may further provide the combiner 130 the corresponding probabilities for the indicated highest probable recognition linguistic unit as determined by the acoustic model and other state information for each audio frame.

The second recognizer 120 may output alphabetic probabilities in consideration of the connecting relationship of alphabet letters, e.g., based on previous final recognition results made available to the second recognizer 120, such as through a shared memory of the speech recognition apparatus 100, by provision from the combiner 130, or through a shared neural network, and may provide the output language model resultant alphabetic probabilities to the combiner 130. Thus, because a final recognition result of a previous audio frame generated by the combiner 130 is reflected in the language model, an accurate recognition result of a current audio frame may be output in consideration of the alphabet letters included in the final recognition result of the previous audio frame.

The combiner 130 may input probabilities of the example 26 alphabet letters of the first audio frame, which are output or made available by the first recognizer 110, into the unified model, and may input probabilities of the example 26 alphabet letters of the first audio frame, which are output or made available by the second recognizer 120, into the unified model, to output by the unified model a current final recognition result, i.e., the alphabet letter 'm' having the highest probability of matching the first audio frame. In this case, the combiner 130 may reflect the alphabet 'm' output for the first audio frame and corresponding probability information in the language model.

As described above, each of the alphabet letters in "mai neim is stiv", determined to have the highest probabilities by the first recognizer 110, may be combined by the combiner 130 with respective highest probability recognition results of the second recognizer 120, so as to accurately recognize/understand the audio signal as corresponding to "My name is Steve".

Figure 3:
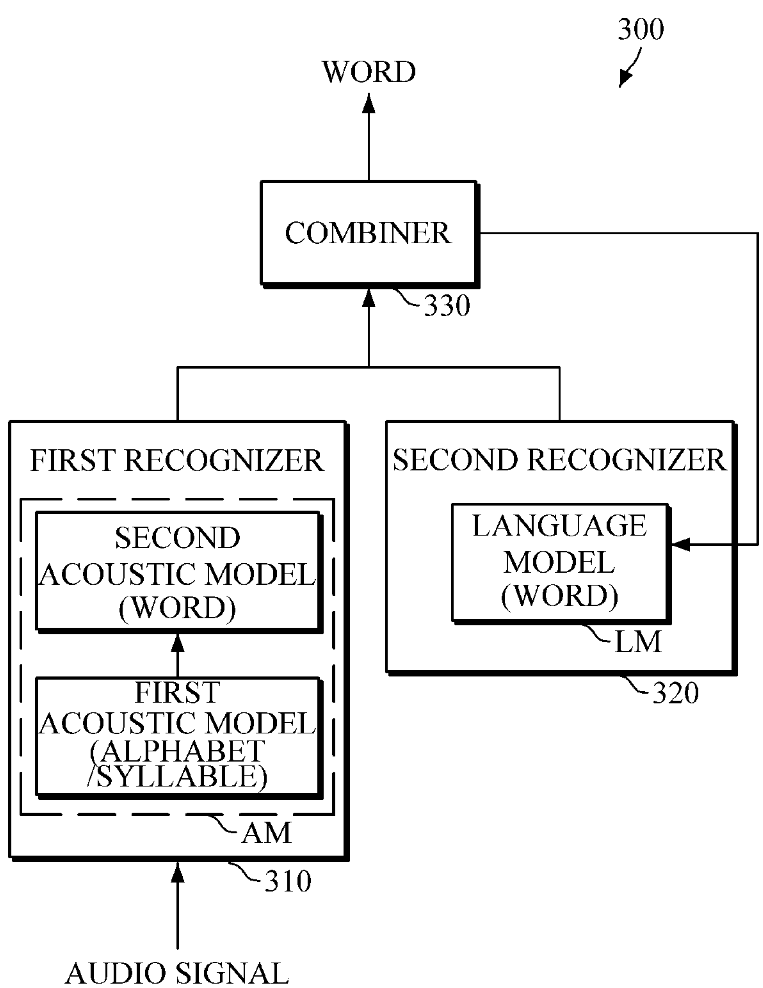
FIG. 3 is a block diagram illustrating a speech recognition apparatus according to one or more embodiments.

FIG. 3 is a block diagram illustrating a speech recognition apparatus according to one or more embodiments.

Referring to FIG. 3, the speech recognition apparatus 300 includes a first recognizer 310, a second recognizer 320, and a combiner 330, for example.

The first recognizer 310 may output a first recognition result in a second linguistic recognition unit that is greater than a first linguistic recognition unit. In this case, the first linguistic recognition unit and the second linguistic recognition unit are any one of the linguistic units as described above. For example, the first linguistic recognition unit may be an alphabetic or syllabic unit, and the second linguistic recognition unit may be greater than the alphabetic or syllabic unit. Hereinafter, for convenience of explanation, the first linguistic recognition unit is an alphabetic or syllabic unit, and the second linguistic recognition unit is a word unit. However, these particular linguistic recognition units are merely discussed as examples, and embodiments are not limited thereto.

In one or more embodiments, the first recognizer 310 may include a first acoustic model and a second acoustic model. In this case, using the first acoustic model, the first recognizer 310 may provide a recognition result of an audio signal in the first linguistic recognition unit, which may include, as only an example, linguistic units of alphabetic or syllabic units. Further, by providing this recognition result, e.g., along with corresponding probabilities and/or state information, to the second acoustic model, the first recognizer 310 may generate a first recognition result in a second linguistic recognition unit, which may include, as only an example, linguistic units of words. Accordingly, the recognition result of the first acoustic model in the first linguistic recognition unit may include, for example, alphabetic or syllabic probabilities or state information, and the first recognition result by the second acoustic model in the second linguistic recognition unit may include, for example, probabilities of words or state information. Though only two acoustic models are shown in sequence, embodiments are not limited to the same, as there may be more than the two levels of acoustic modeling (or more than one level of language modeling), and there may be more than one utilized acoustic model (or language model) used in each level, e.g., in parallel and/or as selectively used such as for personalized or idiolect based models or models based on different dialects or languages. In an embodiment, for example, two levels of acoustic models of different linguistic recognition unit types may reduce the temporal resolution sequentially along the sequence of acoustic models. Further, though the example two levels of acoustic models are modeling adjacent hierarchical linguistic recognition unit types, e.g., with the second linguistic recognition unit type being greater than the first linguistic recognition unit type, embodiments are not limited to the same as additionally, or as an alternative, as non-adjacent linguistic recognition unit types (such as syllables and phrases) may be modeled by immediately sequential acoustic models. In addition, in one or more embodiments, the first acoustic model and the second acoustic model are represented by one or more neural networks in the speech recognition apparatus, e.g., with nodes of the neural network representing outputs of the first acoustic model being connected to nodes of the neural network representing inputs of the second acoustic model, to form a single neural network. As only an example, when the first acoustic model is provided an audio frame that represents less than a single linguistic unit of the first linguistic recognition unit type, recognition results of the first acoustic model may include state information indicating the state of the first acoustic model, e.g., that the first acoustic model has not completed a recognition operation, and when more frame(s) are received for the remainder of the particular linguistic unit and the first linguistic recognition unit is determined, the first acoustic model may output the first recognition result to the second acoustic model. The second acoustic model, and the language model of the second recognizer 320, may similarly output state information of their respective states of operation, including ready for next signal, data, or frame, extent of current recognition operations, and completion of recognition of a corresponding linguistic unit.

As discussed above, when implemented through a neural network, as only an example, the models or neural network may implement an Attention Mechanism. For example, with an Attention Mechanism, the input to a higher/subsequent level (e.g., acoustic or language model level) of a neural network may be a summary of the lower/previous level's output, where the summary is obtained by weighted sum of the inputs, and the weights are the 'attention'. To further this example, when the output of the example lower level is a 5-dimensional vector and the lower level is operated/run for 7 times through a temporal sequence, e.g., for 7 sequential audio frames, then the output of the $7^{th}$ operation could be a 5×7 matrix. Here, the 'attention' may be an example 7-dimensional vector, as a weighting. Thus, the upper level may get as an input (or the lower level may produce as an output) a 5-dimensional vector as a weighted sum of the 7 5-dimensional vectors.

The second recognizer 320 may output a second recognition result in the second linguistic recognition unit by using the language model, e.g., in which a final recognition result of a previous audio data, frame, or signal has been reflected. In this case, the second recognition result in the second linguistic recognition unit may include, for example, a probability for a highest probable word or probabilities for different highly probable words or state information. The language model may also be represented by a neural network, and may be, and have been, trained in one or more embodiments to output a recognition result in the second linguistic recognition unit, depending on embodiment and as discussed above.

The combiner 330 may be configured to combine the first recognition result of the first recognizer 310 and the second recognition result of the second recognizer 320 to output a final recognition result of the audio data, frame, or signal in the second linguistic recognition unit. For example, the combiner 330 may input the first recognition result and the second recognition result into a predetermined unified model, e.g., represented as a neural network in the combiner 330 that generates a final recognition result for each example word of the input audio signal. Accordingly, the combiner 330 may output the final recognition result for each word.

In addition, in one or more embodiments herein, the acoustic model, the language model, and the unified model are integrated and represented as one neural network. For example, nodes of the neural network that represent outputs of the second acoustic model and nodes of the neural network that represent outputs of the language model may be connected to nodes of the neural network that represent inputs of a unified model, so as to form a single neural network. In alternative embodiments herein, one or more of the acoustic models, one or more of the language models, and/or the unified model may be represented by separate or integrated neural networks. For example, each of the one or more of the acoustic models may be represented by separate neural networks, or combined/integrated as a single neural network, and a neural network may represent such one or more acoustic models along with representing only one of the language model or the unified model in a single neural network, with the remaining unified model or language model being represented by a separate neural network, or one or more of the acoustic models may be represented by neural network(s) separate from a neural network that collectively represents the remaining acoustic model(s), the language model, and the unified model, again noting that alternatives are also available. Depending on embodiment, any one, combination, or all of such singular or separate neural networks may be implemented by one or more specially controlled or configured processing devices, processors, or computers, as discussed in further detail below. In addition, such specially controlled or configured processing devices, processors, or computers may further be specially controlled or configured to implement one or more preprocessing operations of the received or captured audio, such as the above discussed non-limiting preprocessing, or the preprocessing may be implemented by alternative hardware and/or one or more specially controlled or configured processing devices, processors, or computers of the speech recognition apparatus or system.

In such a speech recognition system embodiment, any one, combination, or all of such singular or separate neural networks may be implemented by one or more specially controlled or configured processing devices, processors, or computers in one or more servers, with remaining neural networks being implemented by one or more specially controlled or configured processing devices, processors, or computers of a distant or remote device, such as an electronic device with a user interface that receives or captures a user's voice, such as for commands or search requests or other operations, that is configured to transmit the received or captured audio to the one or more servers and configured to receive from the server the outputs of the unified model implemented by a neural network of the one or more servers or from output(s) of either or both of one or more acoustic models and one or more language models implemented by one or more neural networks of the one or more servers. The electronic device may also include such a unified model that may be wholly or partially updated, e.g., regularly or at a particular time, to correspond to the trained unified model of the one or more servers, for example, so the electronic device may perform recognition operations when one or more of such servers are not available. In this example, when the one or more servers subsequently become available the electronic device may inform the servers of any changes to the unified model of the electronic device. The same may also be performed collectively for the acoustic and language models that may be implemented by the electronic device. For example, in embodiments where the acoustic and language models are trained together, so as to thus recognize speech together, the models may be updated together. Rather, in previous approaches where an acoustic model would be trained independently from training of a language model, or where different acoustic models are also independently trained, any updating of the models would also be performed independently based on respective forced alignment information.

Returning to FIG. 3, once a final recognition result of an audio signal is output in the example word unit for a current audio data, frame, or signal, the combiner 330 may reflect the output result in the language model. In this manner, the second recognizer 320 may thereafter calculate and output probabilities of subsequent words of a subsequent audio data, frame, or signal input, or to be input, to the first recognizer 310 by considering the reflected final recognition result of the current audio signal. To this end, and only as an example, the aforementioned single network, e.g., single neural network, may be configured in such a manner that the number of nodes of the neural network representing outputs of the unified model is equal to, or dependent on, the number of nodes of the neural network representing inputs to the language model.

In this case, as discussed above, one or more embodiments include collectively and simultaneously/collectively training the acoustic model, the language model, and the unified model in a learning/training process by using a learning or training algorithm, such as a back propagation learning algorithm. As only an example, one or more embodiments include training the unified model by using training data that includes words or phrases mainly used in/for an electronic device embodiment that operates as, or includes, the speech recognition apparatus 300, but the training is not limited thereto, and may alternatively include independently or separately training the acoustic model(s) and the language model, and then training and/or updating the unified model by deriving and/or updating weightings, weighted values, and/or the like, for respective training recognition results, e.g., provided by the one or more acoustic models and the language model, for the whole network so that final speech recognition by the unified model may be optimized. Whether the acoustic model(s) and the language model are trained collectively, as well as collectively with the unified model, or separately, the unified model may apply different weightings to the provided respective results from the acoustic and language models, e.g., so results of one or more of the acoustic models are given greater reliability or confidence weight than other acoustic models or language models, or where the language model is given greater reliability or confidence weight than the other models, for example. The weightings may be fixed or dynamic and change during training and/or use of the models, and may be based on the model being applied, the type of linguistic unit, or recognition of previous linguistic units, as only examples. The weightings could be simply a single weighting parameter that differently applies to the results from one or more of the models, or could be more complex matrix weightings, as would be understood after an understanding of the present disclosure.

Figure 4:
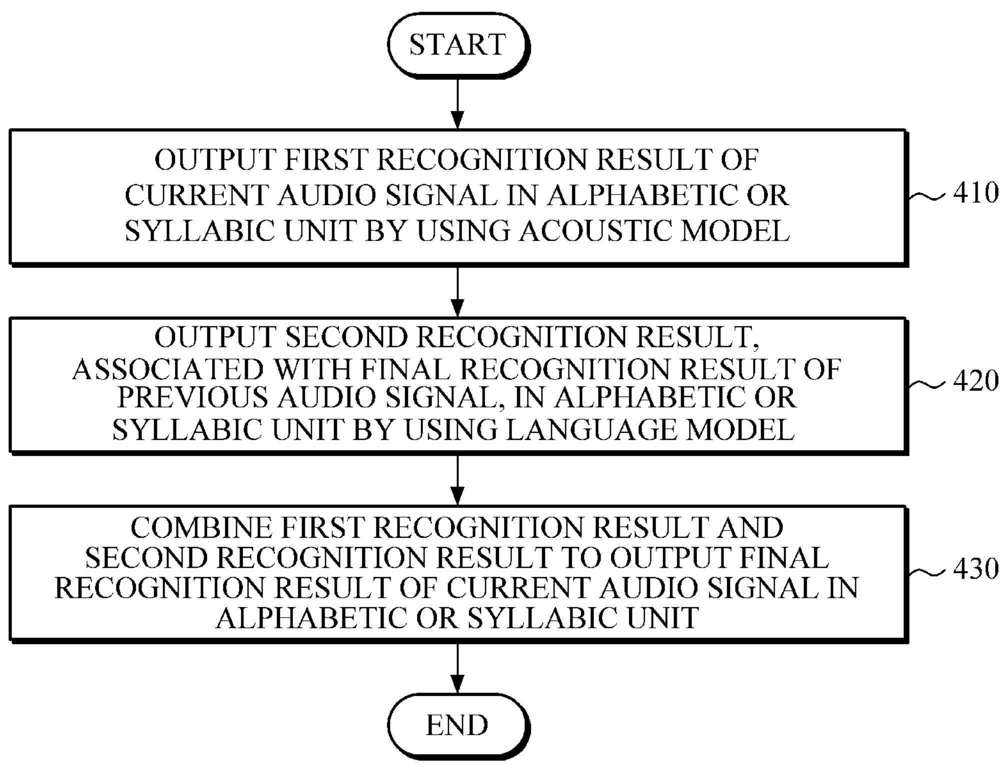
FIG. 4 is a flowchart illustrating a speech recognition method, according to one or more embodiments.

FIG. 4 is a flowchart illustrating a speech recognition method, according to one or more embodiments. As only an example, the speech recognition method illustrated in FIG. 4 may be implemented by using a speech recognition apparatus according to one or more embodiments, such as the speech recognition apparatus 100 of FIG. 1, but is not limited thereto. Similarly, though the speech recognition method of FIG. 4 will be discussed with reference to the speech recognition apparatus 100 of FIG. 1, this is only done for ease of explanation and should not be limited thereto.

The speech recognition apparatus 100 may output a first recognition result of an audio signal in a linguistic recognition unit by using an acoustic model in operation 410. In this case, the audio signal may be converted into audio frames through a preprocessing process of extracting features from the audio signal, and the audio signal may be input to the acoustic model in units of audio frames to output a first recognition result. The first recognition result in a linguistic recognition unit may include, for example, alphabetic or syllabic probabilities of audio frames or state information. The acoustic model may be implemented through a neural network that is configured to provide probabilities or state information, for example, in an alphabetic or syllabic unit, as discussed above.

The speech recognition apparatus 100 may output a second recognition result in a linguistic recognition unit by using the language model in operation 420. For example, the second recognition result may include alphabetic or syllabic probabilities or state information. The language model may be implemented through a neural network that is configured to provide probabilities or state information in an alphabetic or syllabic unit, as discussed above. In one or more embodiments, operation 420 may be initiated after the initiation of operation 410, operation 420 may begin before operation 410, or they may begin at the same time, depending on embodiment.

Subsequently, the speech recognition apparatus 100 may combine the first recognition result and the second recognition result for the audio signal, and may generate or output a final recognition result in a linguistic recognition unit, in operation 430. For example, by using a unified model along with, or that integrates/combines, the acoustic model and the language model, the speech recognition apparatus 100 may combine the first recognition result and the second recognition result, and may output a final recognition result in an example alphabetic or syllabic unit.

Similar to the acoustic model and the language model, the unified model may be based on a neural network. The acoustic model, the language model, and the unified model may be integrated and represented by one network, e.g., one neural network. For example, nodes of the neural network representing outputs of the acoustic model and nodes of the neural network representing outputs of the language model may be connected to nodes of the neural network representing respective inputs of the unified model.

Once the final recognition result of an audio signal is generated or output, the speech recognition apparatus 100 further reflects the final recognition result in the language model in operation 430, so the language model generates, in subsequent implementations of operation(s) 420, the subsequent second recognition result of for a subsequent audio frame by considering the reflected recognition result of the current audio frame.

Figure 5:
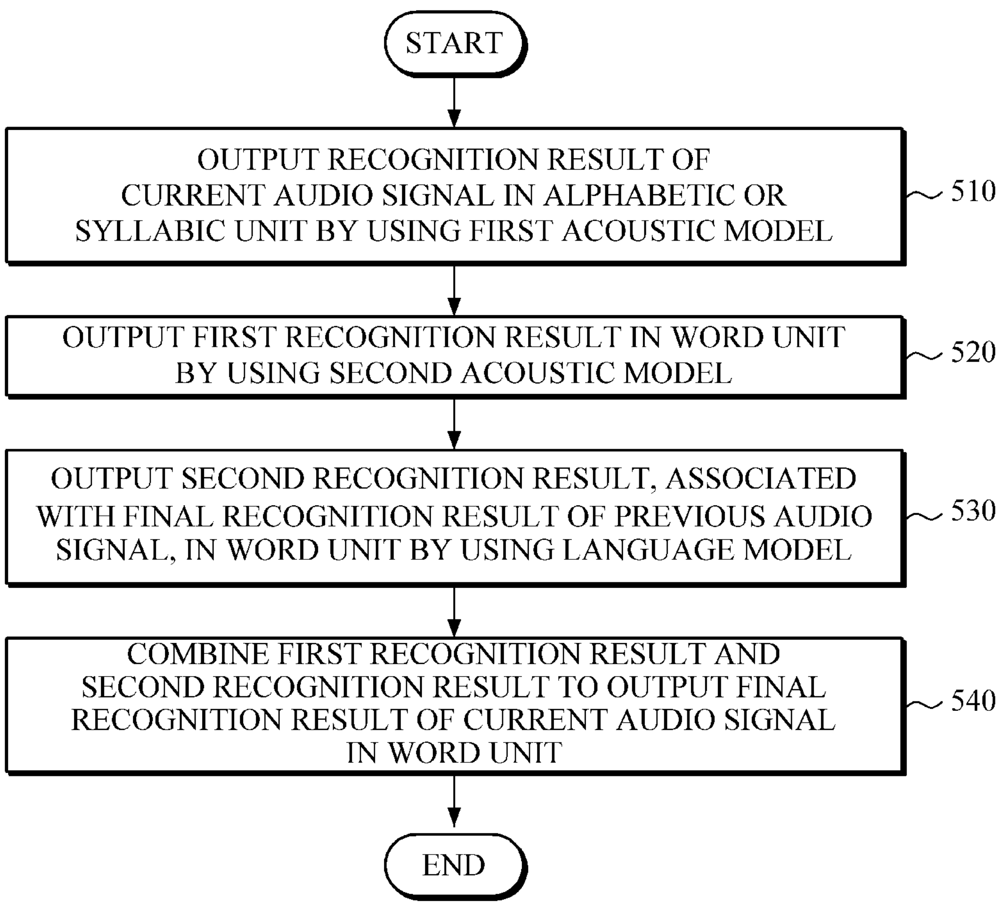
FIG. 5 is a flowchart illustrating a speech recognition method, according to one or more embodiments.

FIG. 5 is a flowchart illustrating a speech recognition method, according to one or more embodiments. As only an example, the speech recognition method illustrated in FIG. 5 may be implemented by using a speech recognition apparatus according to one or more embodiments, such as the speech recognition apparatus 300 of FIG. 3, but is not limited thereto. Similarly, though the speech recognition method of FIG. 5 will be discussed with reference to the speech recognition apparatus 300 of FIG. 3, this is only done for ease of explanation and should not be limited thereto.

The speech recognition apparatus 300 may generate a recognition result of an input audio signal in a first linguistic recognition unit by using a first acoustic model in operation 510. Then, the speech recognition apparatus 300 may generate, in operation 520, a first recognition result in a second linguistic recognition unit (e.g., in a word unit) by using a second acoustic model. The second linguistic recognition unit may be greater than the first linguistic recognition unit. For example, the first linguistic recognition unit may be an alphabetic or syllabic unit, and the second linguistic recognition unit may be a word unit. Further, the first acoustic model and the second acoustic model may be based on a neural network. For example, nodes of a neural network representing outputs of the first acoustic model may be connected to nodes of the neural network representing inputs of second acoustic model, such that the generated results of the first acoustic model may be input to the second acoustic model.

In operation 530, a second recognition result in the second linguistic recognition unit may be output by using the language model in which the final recognition result of a previous audio signal is or has been reflected. For example, the second recognition result may include probabilities of words or state information. In this case, the language model may be based on a neural network, and in one or more embodiments a neural network representing the language model may be trained to output a recognition result in the second linguistic recognition unit, e.g., considering expected connectivity between linguistic units and/or different linguistic unit types for the audio signals, including the reflected final recognition result of the previous audio signal, data, or frame. In one or more embodiments, operation 530 may be initiated after the initiation of either of operations 510 or 520, before operations 510 and 520, or operation 530 may begin at the same time as either of operations 510 or 520, depending on embodiment.

Then, the speech recognition apparatus 300 may combine the first recognition result and the second recognition result, and may output a final recognition result for an audio signal in the second linguistic recognition unit. For example, the speech recognition apparatus 300 may input the first recognition result and the second recognition result into a predetermined unified model that is configured to consider the first recognition result and the second recognition result and generate the final recognition result in the example word unit.

Similar to the acoustic model and the language model, the unified model may be based on a neural network. The acoustic model, the language model, and the unified model may be integrated and represented by one neural network. For example, nodes of the neural network representing the outputs of the second acoustic model and nodes of the neural network representing the outputs of the language model may be connected to nodes of the neural network representing inputs of the unified model, thereby forming a single network. As noted above, this single neural network may also represent the first acoustic model, e.g., with nodes of the neural network representing the outputs of the first acoustic model being connected to nodes of the neural network representing inputs of the second acoustic model.

Next, once the final recognition result of an audio signal is generated or output in a word unit, the speech recognition apparatus 300 may reflect the final recognition result in the language model. To this end, the aforementioned single network may be configured in such a manner that the number of the nodes of the neural network that represents outputs of the unified model is equal to, or dependent on, the number of the nodes of the neural network representing inputs of the language model.

Figure 6:
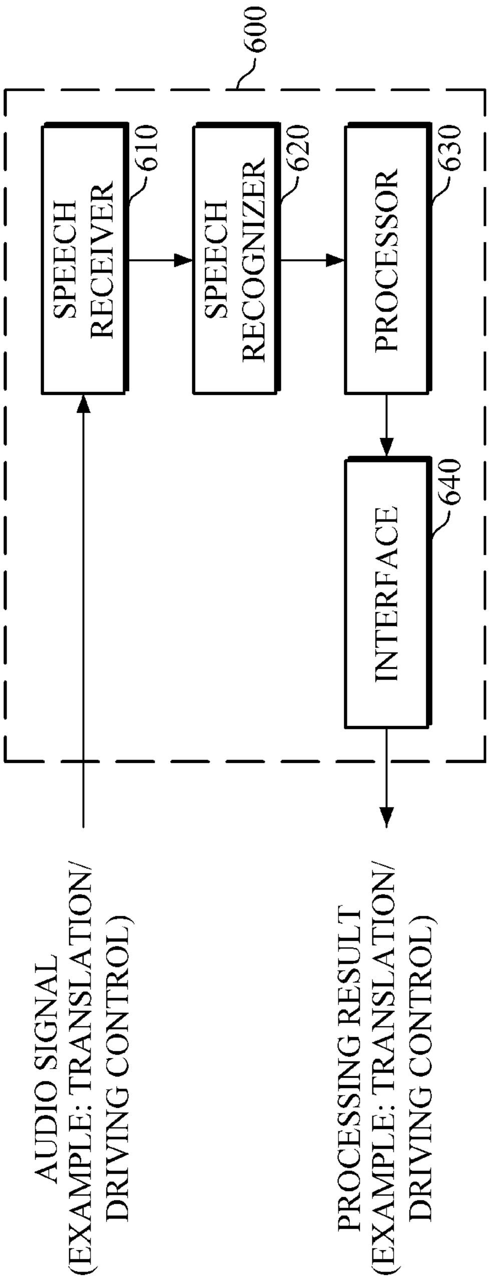
FIG. 6 is a block diagram illustrating a speech recognition apparatus according to one or more embodiments.

FIG. 6 is a block diagram illustrating a speech recognition apparatus, as an electronic device 600, according to one or more embodiments.

In one or more embodiments, the electronic device 600 may include a speech recognition device, such as either or both of the speech recognition apparatuses 100 and 300 of FIGS. 1 and 3, respectively. The electronic device 600 may be any of a TV set, a set-top box, a desktop computer, a laptop computer, a translating machine, a smartphone, a tablet PC, a smart watch, a wearable device, electronic control device of a vehicle, and the like, as only non-limiting examples, and may process a user's various demands by using the mounted/included speech recognition device, for example. However, the electronic device 600 is not limited thereto, and other electronic devices used in any or all applications of speech recognition may also be used.

Referring to FIG. 6, in an embodiment, the electronic device 600 includes a speech receiver 610, a speech recognizer 620, and a processor 630, in which the speech recognizer 620 may correspond to either or both of the speech recognition apparatuses 100 and 300 of FIGS. 1 and 3, respectively. The speech recognizer 620 is hardware that may be implemented by a particular one or more processing devices such as discussed above, or may be implemented by a particular one or more processing devices as discussed above that are also configured to control other operations of the electronic device 600, such as other user interface operations in response to recognized commands or queries through the recognition results of the speech recognizer 620, though embodiments are not limited thereto.

The speech receiver 610 may receive a user's audio signal input through a microphone and the like included in the electronic device 600, also represented by the speech receiver 610. Alternatively, in one or more embodiments, the speech receiver 610 may be included in a separate device of the corresponding speech recognition system embodiment, such as a wired or wireless microphone or controller that is configured to transmit the received or captured audio and/or corresponding preprocessed audio of the received/captured audio when the speech receiver 610 is further configured to implement the above discussed preprocessing of the received/captured audio, to the speech recognition device of the speech recognition system. As illustrated in FIG. 6, the user's audio signal may be related to words, phrases, or sentences to be translated into another language or commands for controlling a TV set, driving a vehicle, or the like. In addition, again as only an example, the preprocessing may include converting a received or captured analog audio signal, e.g., input by a user, into a digital signal, dividing the digital signal into a plurality of audio frames, and transmitting the audio frames to the speech recognizer 620, e.g., as preprocessed audio frame data. As noted above, in one or more embodiments one or more of the acoustic model(s), the language model, and the unified model may be implemented by one or more remote servers, as the speech recognizer 620, and the electronic device 600 may be configured to transmit captured audio, for example, and to receive the appropriate outputs from one or more of the acoustic model and/or language model neural network(s) or outputs of one or more neural networks representing the corresponding unified model based on that transmitted audio.

Thus, in differing embodiments, the speech recognizer 620 may input results of the acoustic model and the language model into a unified model, and may output a final recognition result of an audio signal based on the output results of the unified model.

In addition to embodiments where such a processor 630 is specially controlled or configured to include or operate as the speech recognizer 620, the processor 630 may further control and/or perform additional operations of the electronic device 600, e.g., including operations that may control current or further operations of the electronic device 600 in response to the final recognition result returned by the speech recognizer 620. For example, the processor 630 may output the recognition result of speech input by a user in a processor generated voice through a speaker of the electronic device 600 and the like, or may provide the recognition result in a text format on a display of the electronic device 600, such for drafting messages or documents, or merely for display by the electronic device 600. Further, the processor 630 may be configured to control and perform operations to process commands (e.g., power on/off, volume control, etc.) regarding the electronic device 600. The interface 640 represents the speaker, one or more user interfaces of the electronic device 600, such as a display, keyboard, or touch screen, and/or one or more communication hardware modules of the electronic device 600, such as to perform the above referenced transmissions with the example server, as only non-limiting examples. In an example, the interface 640 may also represent the microphone that generates the audio signal preprocessed by the speech recognizer 610.

Further, in one or more embodiments, when the electronic device 600 is configured to implement translations, such as where the speech receiver 610 obtains the audio data from a live or recorded audio from memory of the electronic device 600 or from another server/device, and such as in case of translating the final recognition result into another language, the processor 630 is further configured to translate the final recognition result output in a text format, as only an example, into the other language, e.g., based on one or more dictionaries stored in the memory of the electronic device 600 or available through transmission from another device or server, and output the translated result in voice and/or in a text format, such as on the display of the electronic device 600. However, the processor 630 is not limited thereto, and may be used in various applications of the electronic device 600. The memory of the electronic device may also store the acoustic and language models, as well as alternative acoustic and language models, as well as data used to train the models, and any information used or generated by the speech recognizer 620, for example. The memory may also store executable instructions so one or more processors of the electronic device 600 may implement any of the above described operations.

In addition to the apparatuses, modules, elements, devices, and other components of FIGS. 1-3 and 6 being hardware elements, any of which may implement the methods of FIGS. 2 and 4-5, as only examples, the methods of FIGS. 2 and 4-5 may be implemented by hardware components, including any above discussed example hardware elements that are included in an electronic device or system embodiment. Examples of hardware components include, as only examples, resistors, capacitors, inductors, power supplies, frequency generators, operational amplifiers, power amplifiers, low-pass filters, high-pass filters, band-pass filters, analog-to-digital converters, digital-to-analog converters, controllers, sensors, generators, memory, drivers, circuitry, and/or any other electronic components known to one of ordinary skill in the art, configured to implement any of the above described methods of FIGS. 2 and 4-5. In one example, the hardware components are implemented by one or more processing devices, or processors, or computers. A processing device, processor, or computer is implemented by one or more processing elements, such as an array of logic gates, a controller and an arithmetic logic device, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer, e.g., by implementing computer execute code, instructions, or software, such as an operating system (OS) and one or more software applications that run on the OS, may perform the operations described herein with respect to FIGS. 2 and 4-5, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. In addition, any connecting lines or connectors shown in the various above referred to apparatus figures are intended to represent example functional relationships and/or physical or logical couplings between the various hardware elements, with many alternative or additional functional relationships, physical connections, or logical connections may be present in a corresponding device embodiment.

The methods illustrated in FIGS. 2 and 4-5 that perform the operations described herein may be performed by a specially controlled or configured processing device, processor, or computer as described above executing processor or computer readable code, instructions, or software to perform the operations described herein.

Processor or computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the processor or computer readable code, instructions, or software include machine code that is directly executed by the processing device, processor, or computer, such as machine code produced by a compiler. In another example, the processor or computer readable code, instructions, or software include higher-level code that is executed by the processing device, processor, or computer using an interpreter, such as implemented with any programming or scripting language such as C, C++, Java, assembler, or the like, with the various algorithms being implemented with any combination of data structures, objects, processes, routines or other programming elements. Based on the disclosure herein, and only after an understanding of the same, programmers of ordinary skill in the art may readily write the processor or computer readable code, instructions, or software based on the block diagrams and the flow charts illustrated in the drawings and the corresponding descriptions in the specification, which disclose algorithms for performing the operations performed by the hardware components and the methods as described above.

The processor or computer readable code, instructions, or software to control a processing device, processor, or computer to implement the hardware components, such as discussed in any of FIGS. 1-3 and 6, and perform the methods as described above in any of FIGS. 2 and 4-5, and any associated data, data files, and data structures, are recorded, stored, or fixed in or on one or more non-transitory computer-readable storage media. Examples of a non-transitory processor or computer-readable storage medium include read-only memory (ROM), random-access memory (RAM), flash memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the processor or computer readable code, instructions, or software and any associated data, data files, and data structures in a non-transitory manner and providing the processor or computer readable code, instructions, or software and any associated data, data files, and data structures to a processing device, processor, or computer so that the processing device, processor, or computer can execute the instructions. In one example, the processor or computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, and in addition to any of the above explanations of potential hardware implementations of the speech recognition apparatus and electronic device embodiments herein, such as described above with regard to any of FIGS. 1-3 and 6, and/or configured to implement the methods described with regard to any of FIGS. 2 and 4-5, may also be a mobile device, such as a cellular phone, a wearable smart device, such as the example smart watch, other wearable devices, a portable personal computer (PC) (such as the example laptop, a notebook, a subnotebook, a netbook, or an ultra-mobile PC (UMPC), the example tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as the example desktop PC, the example TV, such as a high-definition television (HDTV), a DVD player, a Blu-ray player, the example set-top box, or a home appliance, or any other mobile or stationary device capable of wireless or network communication. In one or more embodiments the electronic device or an electronic device system embodiment includes a display, one or more speakers, a user interface, memory or other non-transitory media to store data or recorded audio/video, and/or audio input devices, such as one or more microphones.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A speech recognition apparatus, comprising:

one or more processors configured to:

reflect a final recognition result for a previous audio signal in a language model;

generate a first recognition result of an audio signal, in a first linguistic recognition unit, by using an acoustic model;

generate a second recognition result of the audio signal, in a second linguistic recognition unit, by using the language model reflecting the final recognition result for the previous audio signal; and generate a final recognition result for the audio signal in the second linguistic recognition unit based on the first recognition result and the second recognition result.

2. The apparatus of claim 1, wherein the previous audio signal and the audio signal are portions of an input audio signal.

3. The apparatus of claim 2, wherein the previous audio signal are sequentially previous audio frames in the input audio signal from audio frames in the audio signal.

4. The apparatus of claim 1, where the one or more processors are configured to reflect the final recognition result for the audio signal in the language model and to generate a second recognition result of a subsequent audio signal in the second linguistic unit by using the language model reflecting the final recognition result for the audio signal, and wherein, the one or more processors are further configured to generate a final recognition result for the subsequent audio signal based on a first recognition result of the subsequent audio signal, generated by the acoustic model, and the second recognition result of the subsequent audio signal.

5. The apparatus of claim 1, wherein the acoustic model is an attention mechanism based model that does not implement connectional temporal classification and the first recognition result represents probabilities, and wherein the second recognition result represents probabilities based on temporal connectivity between recognized linguistic recognition units for the audio signal.

6. The apparatus of claim 1, wherein the first linguistic recognition unit is a same linguistic unit type as the second linguistic recognition unit, and wherein the one or more processors are configured to generate a recognition result of the audio signal in another linguistic recognition unit, different from the first linguistic recognition unit, by using a first acoustic model, and generate the first recognition result of the audio signal in the first linguistic recognition unit by using a second acoustic model that is provided the recognition result of the audio signal in the other linguistic recognition unit.

7. The apparatus of claim 1, wherein the first linguistic recognition unit is a different linguistic unit type from the second linguistic recognition unit.

8. The apparatus of claim 1, wherein the first recognition result and the second recognition result respectively comprise information on respective probabilities of, or states for, the first and second linguistic recognition units.

9. The apparatus of claim 1, wherein the generation of the final recognition result for the audio signal is performed based on a result of connecting the first recognition result of the audio signal and the second recognition result of the audio signal with a unified model, integrated with the acoustic model and the language model in a single network, that generates the final recognition result for the audio signal.

10. The apparatus of claim 9, wherein the acoustic model and the language model are models configured as having been previously respectively firstly trained using independent training processes, and with the firstly trained language model, or the respectively firstly trained acoustic and language models, having then been trained together with the unified model in a second training process that uses training data and that reflects training final recognition results in the language model to train the language model.

11. The apparatus of claim 9, wherein the single network is a single neural network configured so as to connect a node of the neural network that represents an output of the acoustic model and a node of the neural network that represents an output of the language model to respective nodes of the neural network that perform the generation of the final recognition result for the audio signal.

12. The apparatus of claim 11, wherein the neural network is configured to connect a node of the neural network that represents an output of the unified model that provides the final recognition result for the audio signal to a node of the neural network that represents an input of the language model to reflect the final recognition result for the audio signal in the language model.

13. The apparatus of claim 12, wherein a number of nodes of the neural network that represent outputs of the unified model is dependent on a number of nodes of the neural network that represent inputs to the language model.

14. The apparatus of claim 11, wherein the neural network is trained in a learning process based on a learning algorithm that includes a back propagation learning algorithm.

15. The apparatus of claim 11, wherein the neural network is trained in a learning process that includes simultaneously training the acoustic model, the language model, and the unified model.

16. The apparatus of claim 1, wherein, to generate the first recognition result, the one or more processors perform a neural network-based decoding based on an Attention Mechanism to determine the first recognition result in the first linguistic recognition unit.

17. The apparatus of claim 1, wherein the acoustic model considers pronunciation for the audio signal and the language model considers connectivity of linguistic units of the audio signal.

18. The apparatus of claim 1, further comprising a speech receiver configured to capture audio of a user and to generate the previous audio signal and the audio signal from the captured audio, wherein a first one or more processors of the one or more processors are configured in a speech recognizer to perform the generation of the first recognition result of the audio signal, the generation of the second recognition result of the audio signal, the generation of the final recognition result for the audio signal, and a reflection of the final recognition result for the audio signal in the language model, and wherein a second one or more processors of the one or more processors are configured to perform predetermined operations and to perform a particular operation of the predetermined operations based on the final recognition result for the audio signal.

19. The apparatus of claim 18, wherein at least one processor of the first one or more processors is included in the second one or more processors.

20. The apparatus of claim 18, wherein at least one of the first one or more processors is configured to perform at least one of controlling an outputting of the final recognition result for the audio signal audibly through a speaker of the apparatus or in a text format through a display of the apparatus, translating the final recognition result for the audio signal into another language, and processing commands for controlling the performing of the particular operation through at least one of the second one or more processors.

21. The apparatus of claim 1, wherein the acoustic model and the language model are configured according to having been trained together, in a learning process using training data, through reflecting of training final recognition results in the language model.

22. A processor implemented speech recognition method, comprising:

reflecting a final recognition result for a previous audio signal in a language model;

generating a first recognition result of an audio signal, in a first linguistic recognition unit, by using an acoustic model;

generating a second recognition result of the audio signal, in a second linguistic recognition unit, by using the language model reflecting the final recognition result for the previous audio signal; and generating a final recognition result for the audio signal in the second linguistic recognition unit based on the first recognition result and the second recognition result, wherein the previous audio signal and the audio signal are respective portions of an input audio signal.

23. The method of claim 22, wherein the first linguistic recognition unit is a different linguistic unit type from the second linguistic recognition unit.

24. The method of claim 22, wherein the first linguistic recognition unit is a same linguistic unit type as the second linguistic recognition unit, and the method further comprises generating a recognition result of the audio signal in another linguistic recognition unit, different from the first linguistic recognition unit, by using a first acoustic model, and generating the first recognition result of the audio signal in the first linguistic recognition unit by using a second acoustic model that is provided the recognition result of the audio signal in the other linguistic recognition unit.

25. The method of claim 22, wherein the acoustic model and the language model are configured according to having been trained together, in a learning process using first training data, through reflecting of training final recognition results in the language model.

26. The method of claim 25, wherein the acoustic model and the language model are further configured as having then been trained together with a unified model, integrated with the acoustic model and the language model in a single network, configured to perform the generation of the training final recognition results.

27. The method of claim 22, wherein the acoustic model and the language model are models configured as having been previously respectively firstly trained using independent training processes, and with the firstly trained language model, or the respectively firstly trained acoustic and language models, having then been trained together with a unified model, integrated with the acoustic model and the language model in a single network, in a second training process that uses training data and that reflects training final recognition results in the language model to train the language model.

28. A non-transitory computer readable medium storing instructions, which when executed by one or more processors, causes the one or more processors to implement the method of claim 22.

29. A speech recognition apparatus, comprising:

one or more processors configured to:

reflect a final recognition result for one or more previous frames of an audio signal in a language model;

generate a first recognition result of one or more current audio frames of the audio signal, in a first linguistic recognition unit, by using an acoustic model;

generate a second recognition result for the one or more current audio frames of the audio signal, in a second linguistic recognition unit, by using the language model reflecting the final recognition result for the one or more previous frames of the audio signal; and generate a final recognition result for the one or more current audio frames of the audio signal in the second linguistic recognition unit based on the first recognition result and the second recognition result.

30. The apparatus of claim 29, wherein the one or more previous frames are sequentially previous in the audio signal from an audio frame of the one or more current audio frames.

31. The apparatus of claim 29, wherein the first linguistic recognition unit is a same linguistic unit type as the second linguistic recognition unit, and wherein the one or more processors are configured to generate a recognition result for the one or more current audio frames of the audio signal in another linguistic recognition unit different from the first linguistic recognition unit by using a first acoustic model, and generate the first recognition result for the one or more current audio frames of the audio signal in the first linguistic recognition unit by using a second acoustic model that is provided the recognition result for the one or more current audio frames of the audio signal in the other linguistic recognition unit.

32. The apparatus of claim 29, wherein the first linguistic recognition unit is a different linguistic unit type from the second linguistic recognition unit.

33. The apparatus of claim 29, wherein the generation of the final recognition result for the one or more current audio frames of the audio signal is performed based on a result of connecting the first recognition result for the one or more current audio frames of the audio signal and the second recognition result for the one or more current audio frames of the audio signal with a unified model, integrated with the acoustic model and the language model in a single network, that generates the final recognition result for the one or more current audio frames of the audio signal.

34. The apparatus of claim 33, wherein the acoustic model and the language model are models configured as having been previously respectively firstly trained using independent training processes, and with the firstly trained language model, or the respectively firstly trained acoustic and language models, having then been trained together with the unified model in a second training process that uses training data and that reflects training final recognition results in the language model to train the language model.

35. The apparatus of claim 33, wherein the single network is a single neural network configured so as to connect a node of the neural network that represents an output of the acoustic model and a node of the neural network that represents an output of the language model to respective nodes of the neural network that perform the generation of the final recognition result for the one or more current audio frames of the audio signal.

36. The apparatus of claim 35, wherein the neural network is trained in a learning process that includes simultaneously training the acoustic model, the language model, and the unified model.

* * * * *